United States Patent
Hinz et al.

(10) Patent No.: US 10,549,585 B2
(45) Date of Patent: Feb. 4, 2020

(54) TIRE PRESSURE CONTROL SYSTEM

(71) Applicant: Tire Pressure Control International Ltd., Edmonton (CA)

(72) Inventors: Lesley Joseph Hinz, Spruce Grove (CA); Brian Douglas Spreen, Parkland County (CA)

(73) Assignee: TIRE PRESSURE CONTROL INTERNATIONAL LTD, Edmonton, AB (CA)

( * ) Notice: Subject to any disclaimer, the term of this patent is extended or adjusted under 35 U.S.C. 154(b) by 0 days.

(21) Appl. No.: 15/441,039

(22) Filed: Feb. 23, 2017

(65) Prior Publication Data

US 2018/0236825 A1 Aug. 23, 2018

(51) Int. Cl.
| | |
|---|---|
| *G06F 7/00* | (2006.01) |
| *B60C 23/00* | (2006.01) |
| *B60C 23/02* | (2006.01) |
| *B60C 23/10* | (2006.01) |
| *B60C 29/00* | (2006.01) |

(52) U.S. Cl.
CPC ................................. *B60C 23/003* (2013.01)

(58) Field of Classification Search
CPC ..... B60C 23/003; B60C 23/002; B60C 23/02; B60C 23/00
USPC .............................. 701/36; 340/442; 152/415
See application file for complete search history.

(56) References Cited

U.S. PATENT DOCUMENTS

| | | | |
|---|---|---|---|
| 4,583,566 A | 4/1986 | Kalavitz et al. | |
| 5,180,456 A | 1/1993 | Schultz et al. | |
| 5,249,609 A | 10/1993 | Walker et al. | |
| 5,516,379 A * | 5/1996 | Schultz | B60C 23/003 141/38 |
| 5,587,698 A * | 12/1996 | Genna | B60C 23/003 116/34 R |
| 6,144,295 A * | 11/2000 | Adams | B60C 23/003 137/224 |

(Continued)

FOREIGN PATENT DOCUMENTS

CN 201011582 Y 1/2008

OTHER PUBLICATIONS ieeexplore.ieee.org/document/5229915, "Design of tire pressure monitoring system based on resonance frequency method", available as early as Jul. 9, 2015.

(Continued)

*Primary Examiner* — Mahmoud S Ismail
(74) *Attorney, Agent, or Firm* — Davis & Bujold PLLC; Michael J. Bujold

(57) ABSTRACT

A tire pressure control system for a vehicle has a supply of compressed air connected to a vehicle tire through an air conduit having a valve and an air pressure sensor that senses the air pressure in the vehicle tire. A microcontroller is connected to control the valve to supply compressed air to the vehicle tire or to vent compressed air from the vehicle tire. The microcontroller has instructions to: calculate a valve operation required to achieve a target pressure; operate the valve according to the calculated valve operation; measure an adjusted air pressure after the calculated valve operation is completed; calculate a further valve operation to achieve the target pressure if necessary; and compare the results of the valve operation to the calculated valve operation and recalibrating the algorithm based on any differences.

17 Claims, 3 Drawing Sheets

(56) References Cited

U.S. PATENT DOCUMENTS

| | | |
|---|---|---|
| 6,666,078 B1 | 12/2003 | Claussen et al. |
| 6,758,088 B2 * | 7/2004 | Claussen ............... B60C 23/003 141/38 |
| 7,240,542 B2 | 7/2007 | Gustafsson et al. |
| 8,115,613 B2 | 2/2012 | Patel et al. |
| 8,744,679 B2 | 6/2014 | Boss et al. |
| 2005/0194080 A1 | 9/2005 | White et al. |
| 2013/0282233 A1 | 10/2013 | Hsia |
| 2015/0005982 A1 | 1/2015 | Muthukumar |
| 2018/0104993 A1* | 4/2018 | Gillen |

OTHER PUBLICATIONS

European Search Report issued in corresponding European Patent Application No. 18155344.7 dated Jun. 14, 2018.

* cited by examiner

TIRE PRESSURE CONTROL SYSTEM

TECHNICAL FIELD

This relates to a tire pressure control system that increases and decreases the pressure in the tires of a vehicle.

BACKGROUND

Tire pressure control systems are used to control the tire pressure in vehicles to adapt to different driving conditions, such as different speeds, different vehicle loads, different road conditions or terrain, etc. or to reduce tire wear and increase fuel efficiency. For example, a lower tire pressure increases the surface area between the tire and the ground, which can improve traction and distribute weight on the ground surface, while a higher tire pressure may be used to reduce wear and increase fuel efficiency. Tire pressure control systems may also be used to maintain a desired tire pressure resulting from on slow leaks or changes in temperature.

U.S. Pat. No. 8,744,679 (Boss et al.) entitled "Tire pressure adjustment" describes a system in which the tire pressure is controlled by a computer controller in response to data received from sensors. U.S. Pat. No. 6,144,295 (Adams et al.) entitled "Automatic central tire inflation system" describes another tire pressure control system that can be used to automatically or manually control the pressure in the tires of a work vehicle.

Another example of a tire pressure control system is described in U.S. Pat. No. 4,583,566 (Kalavitz et al.) entitled "Pressure control system", and describes a system that is similar to the commercially available tire pressure control system offered by Tire Pressure Control International Ltd., referred to as the TIREBOSS™ system. The TIREBOSS system uses a small air tank with an orifice sized to simulate the dynamics of the vehicle tires (referred to as a "static tank"). During pressure change operations, the system measures the pressure in the static tank, which acts as a proxy for the pressure in the tires. This provides a working approximation of the tire pressure until the system comes to equilibrium and the actual tire pressure can be measured. This makes the pressure control task trivial and relatively foolproof. However, the "static tank" adds cost and size to the system.

SUMMARY

There is provided a tire pressure control system for a vehicle, comprising a supply of compressed air connected to supply compressed air to a vehicle tire through an air conduit having a valve, an air pressure sensor that senses the air pressure in the vehicle tire, and a microcontroller that is connected to control the valve. The microcontroller controls the valve to supply compressed air to the vehicle tire to increase the air pressure in the vehicle tire, and to vent compressed air from the vehicle tire to atmosphere to decrease the air pressure in the vehicle tire. The microcontroller comprises instructions to: upon receiving a signal indicative of a required change in tire pressure from a current pressure to a target pressure, calculate a valve operation required to achieve the target pressure from the current pressure based on an algorithm stored in the microcontroller; operate the valve according to the calculated valve operation; measure an adjusted air pressure using the air pressure sensor after the calculated valve operation is completed; compare the adjusted air pressure to the target pressure and calculating a further valve operation to achieve the target pressure from the adjusted air pressure if necessary; and compare the results of the valve operation to the calculated valve operation and recalibrate the algorithm based on any differences.

According to another aspect, there is provided a method of controlling pressure in a vehicle tire, the vehicle tire being connected to a supply of compressed air by an air conduit having a valve, the valve being controlled by a microcontroller, the method comprising the steps of: transmitting a signal to the microcontroller indicative of a required change in tire pressure from a current pressure to a target pressure; causing the microcontroller to calculate a valve operation required to achieve the target pressure from the current pressure based on an algorithm stored in the microcontroller; causing the microcontroller to operate the valve according to the calculated valve operation; measuring an adjusted air pressure using the air pressure sensor after the calculated valve operation is completed; comparing the adjusted air pressure to the target pressure and calculating a further valve operation to achieve the target pressure from the adjusted air pressure if necessary; and comparing the results of the valve operation to the calculated valve operation and recalibrating the algorithm based on any differences.

In other embodiments, tire pressure control system or the method may include the following features, alone or in combination: the valve operation may comprise opening the valve for a calculated period of time; the microcontroller may further comprise instructions to activate an alarm condition if the comparison of the results of the valve operation to the calculated valve operation results in a difference that exceeds a predetermined threshold; the signal indicative of the required change may be a signal from a manual input device or from one or more condition sensors that measure one or more vehicle conditions, the signal from the one or more conditions sensors being compared to predetermined ranges in the microcontroller to determine the target pressure; the one or more vehicle conditions may comprise at least one of vehicle load, vehicle speed, and location; the microcontroller comprises instructions to calibrate the algorithm by operating the valve according to a series of predetermined valve operations and measuring the resulting tire pressures; there may be more than one tire connected to the supply of compressed air by one or more valves; and wherein, for a change in pressure that is greater than a predetermined threshold, the calculated valve operation comprises a series of valve operations, wherein an intermediate pressure is measured between valve operations in the series to recalibrate a remainder of the series of valve operations.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
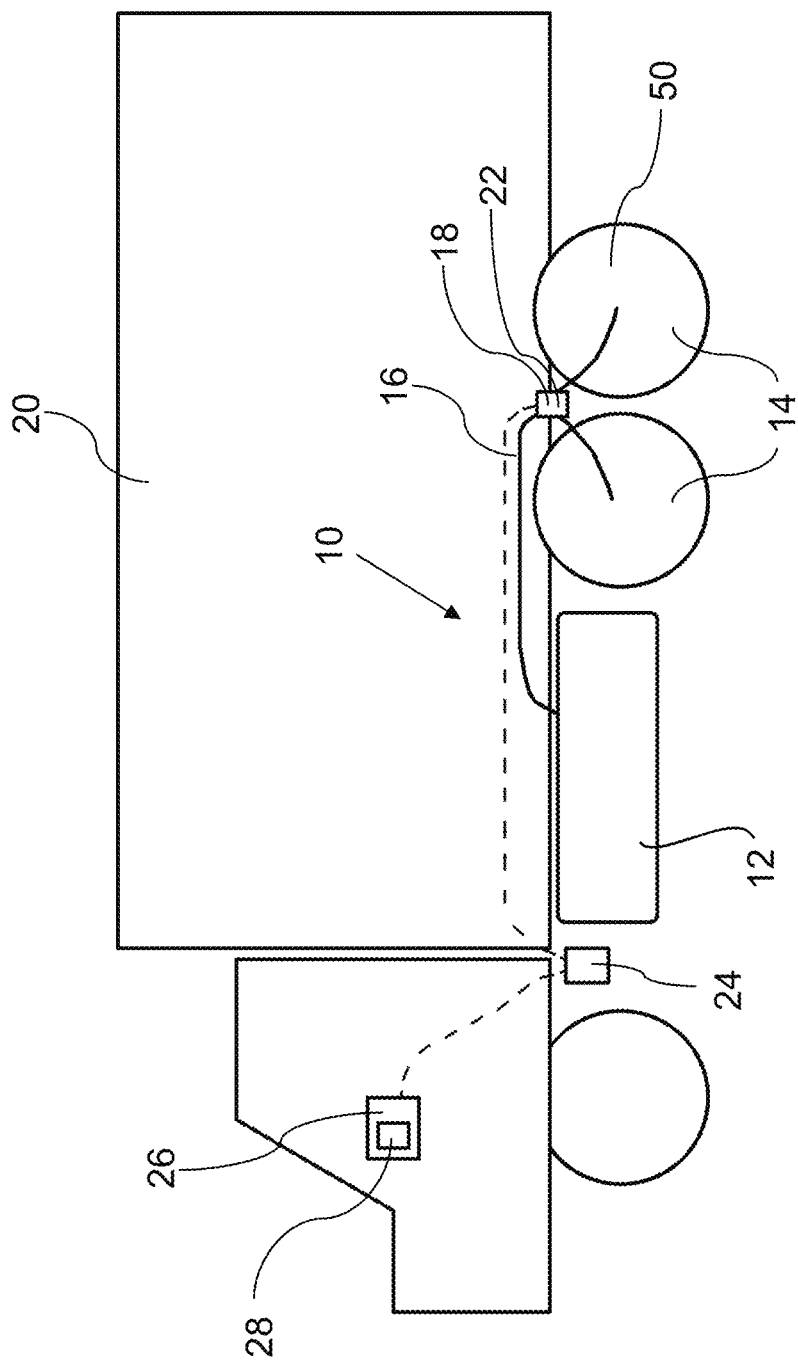
FIG. 1 is a schematic view of a truck with a tire pressure control system.

A tire pressure control system, generally identified by reference numeral 10, will now be described with reference to FIG. 1 through FIG. 3.

The system described herein measures and controls the tire pressure using algorithms. The algorithms are used in conjunction with a microcontroller, which allows the system to effectively learn how the vehicle air supply and tire groups are configured, and optimize the inflation and deflation control of the tires, while continually learning these parameters during normal operation. The system may also offer the ability to autonomously control tire pressures without operator intervention where that functionality is required. In addition, additional modules may be added for various other features to enhance the functionality of the system as desired.

Figure 2:
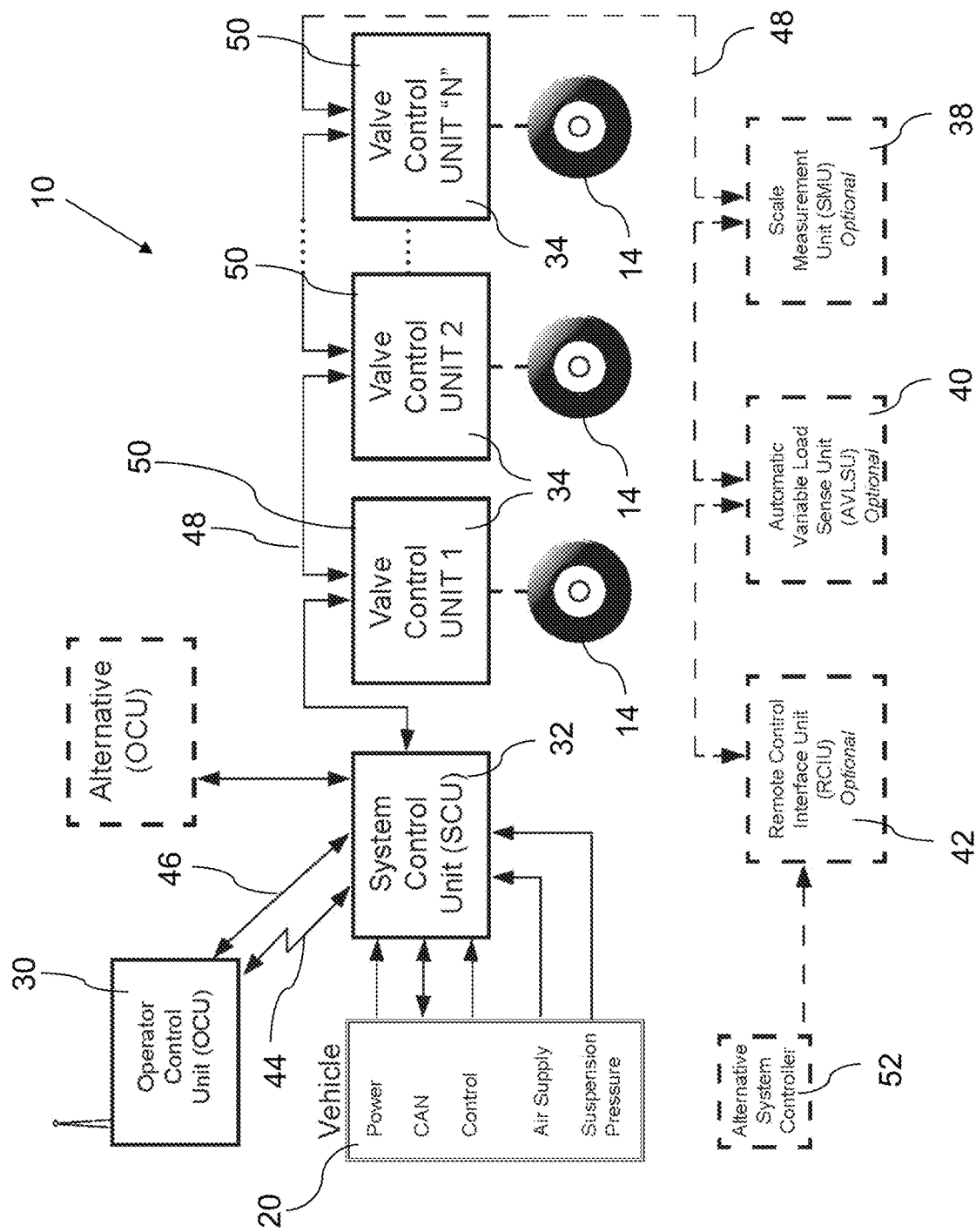
FIG. 2 is a block diagram of the tire pressure control system.

Referring now to FIG. 1, tire pressure control system 10 uses a supply of compressed air 12 that is connected to supply compressed air to the vehicle tires 14 through an air conduit 16, and controlled by a valve 18. The supply of compressed air 12 may be any suitable source, such as an existing air supply system that is commonly found on some transport vehicles 20 as shown, which typically includes a tank and a compressor, or may be an additional or dedicated air supply system installed on the vehicle 20, which will typically also include at least a compressor. The conduit 16 and valves 18 used to connect between the air supply 12 and the tires 14 may have various configurations based on the preferences of the user and the intended use. For example, each valve 18 may control one tire 14, or one valve 18 may control a group of tires 14, in which the tires are connected in parallel downstream of the valve. In the depicted example, a single valve 18 is used to control a group of tires 14 in a double-axle vehicle 20. It will be understood that the air system may take various configurations based on the type of vehicle and the preferences of the user, and that the principles given in the description below will apply equally to the various possible configurations.

The pressure in the tires 14 is detected by air pressure sensors 22, which are preferably included as part of the valves 18, although they may also be separate components. The valves 18 are controlled by a microcontroller 24 to control the supply of compressed air to the vehicle tires 14 to increase the air pressure in the vehicle tires 14, and to vent compressed air from the vehicle tires 14 to atmosphere to decrease the air pressure.

The microcontroller 24 may be any suitable microcontroller, and generally includes a memory unit, a processing unit, and input/output connections. As will be understood, these components may be integrally formed, or separately formed and connected together. The microcontroller 24 is programmed with instructions to calculate a valve operation that may be used to achieve a target pressure from the current pressure. This calculation is initiated when a signal is received indicative of the need for a change in tire pressure, such as from an operator's interface 26 or from other sensors 28. The calculation is based on an algorithm stored in the microcontroller. Typically, the valve operation will be to open the valve 18, either to the air supply to increase the air pressure, or open to atmosphere to vent the tires 14.

The primary variable of the valve operation will be the length of time that the valve 18 remains open. In more complex systems, other factors may also be included, such as the amount to which the valve system is opened, or in systems in which more than one valve are used, the sequence in which the valve are opened. The valves 18 are then opened in the calculated valve operation. Once the operation is complete, the adjusted air pressure is measured using the air pressure sensor 22, and the adjusted air pressure is compared to the target pressure. If necessary, a further valve operation may be calculated and performed in order to arrive at the target pressure. The results of the valve operation, either the initial or both the initial and the supplemental operations, are compared to the anticipated results from the calculated valve operation. Based on this comparison, the microcontroller may be programmed to take different steps. Most importantly, the microcontroller will recalibrate the algorithm based on the difference. This improves the accuracy of future changes in tire pressure, and also adapts the system for any changes that may develop in the air supply, the valves, or any orifices. As will be discussed below, the changes to the algorithm are preferably damped to avoid any drastic changes to the algorithm. This may be done by storing results from previous changes in pressure in memory and using an appropriate statistical or averaging calculation, and can be selected by those skilled in the art. In the case of a valve operation that is based solely on time, an appropriate algorithm will be the change in pressure divided by the rate of change, integrated over time, to determine the amount of time required to arrive at the desired pressure. The pressure change will be based on whether the pressure is increasing or decreasing, and may be defined by a linear function, or may be a more complex function, such as an n-degree function, a function that is based on the starting pressure, or other factors that may be used to improve the accuracy of the function, if necessary. Depending on the effect of the various functions, they may be included in the algorithm in a suitable manner to properly calculate an operation to achieve the desired pressure change. The observed results may be used to modify coefficients or other factors to optimize the algorithm used to calculate the pressure change as discussed herein. In some circumstances, if the change in pressure is greater than a predetermined threshold, the calculated valve operation may be divided into a series of valve operations, which allows an intermediate pressure to be measured between valve operations to ensure the target pressure is not overshot during the pressure change.

In addition to recalibrating the algorithm, the microcontroller may also be programmed to activate an alarm condition if the comparison of the results of the valve operation to the calculated valve operation results in a difference that exceeds a predetermined threshold. In the depicted embodiment, the alarm will be communicated to the operator's interface 26, but may also be communicated in other ways, such as wirelessly to a remote device.

As noted above, the signal that is received by the microcontroller may be a signal from a manual input device, such as a panel or console 26 mounted in the operator's cabin, or may be received from one or more condition sensors 28 that measure one or more vehicle conditions. These may include sensors that measure the speed of the vehicle, the load of the vehicle, the location of the vehicle, etc. and allow the microcontroller to determine the appropriate tire pressure and make the necessary changes. In that case, the microcontroller will be programmed to analyse the signals received, such as by comparing the values from the sensors to predetermined ranges and possibly other conditions, determine the appropriate tire pressure based on any controls or logic with which it has been programmed, and implement a valve operation to achieve the required pressure change. The microcontroller may be programmed to apply some damping or averaging to avoid unnecessary pressure changes. For example, there may be a delay in adjusting tire pressure change as a result of temporary changes in the speed of the vehicle, etc. The changes in tire pressure may also be subject to other constraints, such as a measured location that requires a lower tire pressure, regardless of the load or speed, or a manual entry by an operator. In other examples, the system may suggest tire pressure changes, but require operator approval before being implemented.

As noted above, the pressure sensor is preferably located in the valve itself. The system does not rely on the direct determination of tire pressure while performing inflation or deflation operations as a pressure sensor located in the valve will generally not provide an accurate reading. For example, during an inflation operation, the sensor will read a pressure somewhere between the supply pressure and the tire pressure, where the reading of the pressure sensor is determined by the capacity of the primary air source (the wet tank) and the output of the compressor, and by the dynamics of the system, such as the length and size of plumbing interconnecting components and the characteristics of the valve itself, as well as the current pressure in the tires and the number of valves simultaneously in operation. During a deflation operation, the measured pressure will be close to atmospheric pressure as the sensor is located near the open exhaust valve. Instead, the pressure can only be properly measured with the valve in a closed position.

While the system may not be able to accurately measure a tire pressure (or reasonable proxy) during the pressure control process, the system performs a characterization of the system, effectively "learning" the properties of the air supply/valve/tire combination. The system is designed to adapt over time, such that it is able to detect and recalibrate for any changes due to compressor wear, airflow restriction or leakage, etc. The system may also be designed to raise an alarm or warning that maintenance may be required or that a danger exists, as appropriate, when it detects a significant deviation from the "original" calibration.

The deflation characteristics are generally well determined. Each valve and its associated tire or group of tires is largely independent and can be modeled reasonably accurately during a system calibration at the time of installation. Deflations may then be managed by computing an estimate of the time required to effect the desired pressure change based on that calibration data. It has been found that this approach provides reasonable results, and that it may be possible to detect a number of failure conditions in the system by careful examination of the results of each deflation operation.

The inflation characteristics are generally more difficult to determine relative to the deflation characteristics. The time required to effect any given pressure change in the tires depends on the starting pressure in the wet tank at the start of the inflation operation, the output of the compressor, which may vary based on various factors such as engine speed among others, and other factors, some of which may be unknown to the system. The inflation characteristics also vary depending on the number of valves (in a multi-valve system) that are performing inflation operations simultaneously as well as any pressure differences between tires controlled by these valves. Clearly, when filling tires or groups of tires simultaneously, more air will flow to tires with a lower starting pressure if multiple groups of tires are inflated simultaneously.

While the many variables involved suggested that it might be impractical to perform a calibration that would provide reasonable results across the range of operating conditions, initial testing has demonstrated that selecting a somewhat aggressive inflation profile provides surprisingly good results for modest pressure changes, such as pressure changes that may be in the range of 5-20 psi. In addition, employing a "sneak peek" feature, where a valve autonomously pauses in the middle of a long inflation cycle to check on progress, may be used to prevent significant over-inflation during longer inflation cycles, such as pressure changes that are more than 20 psi. The actual threshold that requires more than one cycle will depend on the preferences of the user, as well as characteristics of the system, observed or otherwise, and may be recalibrated based on these observations. Other optimizations may be determined based on additional measurements and observations, such as measurement of the initial pressure transient, and an analysis of the shape of the pressure curve measured at the valve during the inflate operation to fine-tune the calibration data as the system operates.

The effect of each pressure change operation is evaluated at completion of the operation to compare the expected based on the calibration data to the observed result. If there is a significant difference between the expected and observed results, and there is no detectable reason for the difference, such as some sort of fault being detected, then the calibration data is adjusted so that subsequent operations produce improved results. This self-optimizing behavior may be damped so that changes are made incrementally. In particular, increasing inflation or deflation times may be damped, or damped more heavily, to mitigate significant over or under-inflation during an operation. The optimized calibration data may be tracked against the initial "as installed" data so that a significant change from the original calibration results in a warning that something significant has changed in the system, possibly requiring maintenance or raising a safety concern.

The ability of the system to optimize itself as it operates provides a number of advantages. Firstly, it allows the system to improve as it is used, essentially making pressure changes quicker and more accurately while accumulating fewer operational cycles on the valves. Secondly, it simplifies installation, making the initial setup somewhat less critical. If the calibration performed upon installation is slightly wrong, it will improve over time. Finally, it permits the system to detect and diagnose a wide range of impending problems before they become serious enough to significantly impair operation. For example a kinked hose that is starting to provide an airflow restriction can be detected early before it has serious effects. Similarly, valve issues such as sticking valves can be detected so timely maintenance can be performed. This calibration and tuning may be designed to be largely invisible to the user. A full calibration may be performed during installation or when a change to the system is detected, for example, when a different trailer is connected. A manual recalibration can be initiated in a system diagnostic mode when significant changes are made to the vehicle, such as when a tire size change or a compressor overhaul occurs, for example.

The system also preferably has the capability to manually adjust the calibration data from the user interface. This permits manual fine-tuning of system operation, evaluation of automatic tuning operations performed, and the ability to modify the pressure control performance in accordance with system preferences.

Figure 3:
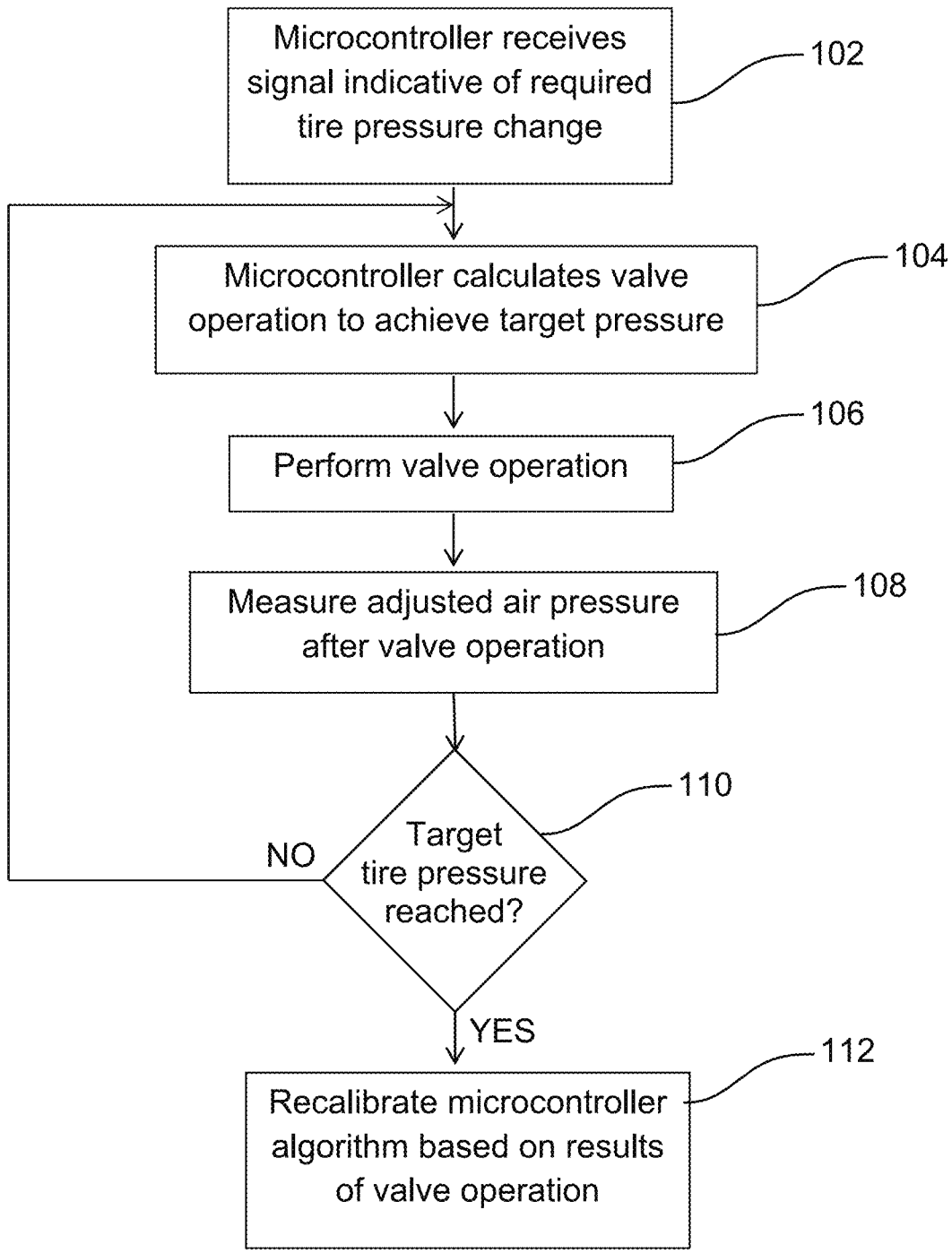
FIG. 3 is a flow chart of the tire pressure control system.

A block diagram of the basic operation of the microcontroller is shown in FIG. 3. In step 102, the microcontroller receives signal indicative of required tire pressure change. In step 104, the microcontroller calculates valve operation to achieve target pressure. In step 106, the valve operation is performed. In step 108, the adjusted air pressure is measured after the valve operation is complete. In decision step 110, the measured pressure is compared to the target pressure and additional valve operations are performed as needed. In step 112, the microcontroller algorithm is recalibrated based on the results of the valve operation.

There will now be described a particular example of a system with respect to FIG. 2, which is focused primarily on the control elements of system 10 used to implement the elements discussed above. It will be understood that the particular design may be modified to achieve the elements described above as well as any additional elements or capabilities described below.

The depicted system 10 has an Operator Control Unit (OCU) 30, a System Control Unit (SCU) 32, one or more Valve Control Units (VCUs) 34, optional expansion units such as a Scale Measurement Unit (SMU) 38, an Automatic Variable Load Sense Unit (AVLSU) 40 that provides infinitely variable tire pressure control, and a Remote Control Interface Unit (RCIU) 42.

The OCU 30 provides the operator interface to the system allowing configuration, selection of operating modes, reporting of alarm conditions, data logging and system maintenance functions. It displays system parameters in a convenient, user friendly manner. It may be implemented as a specialized touchscreen computer running Linux. A suitable example may contain an ARM Cortex-A9 processor, a 5.7" capacitive touch screen display and the external interfaces required to support system operation.

The OCU 30 preferably is able to provides GPS information to the system, which allows vehicle speed to be measured, which may be used to monitor speed limits for various tire pressures and loads, and initiate auto inflations in the case of over speed conditions for the current selections, as well as location information and time for logging purposes. The OCU 30 may communicate in various ways, such as by using a Bluetooth LE interface for sending and receiving Bluetooth signals 44, an RS-485 interface that communicates over a signal cable 46 to the System Controller 32, and other common communication modules, such as a Wi-Fi radio for data transfer and program updates.

The OCU 30 is preferably connected to receive switched power from the vehicle with a battery backup to maintain operation as required when the vehicle is shut off.

The SCU 32 coordinates all aspects of system operation, accepting commands from and reporting to the OCU 30 as well as controlling the other system components. It measures air pressures from both the vehicle air supply (for safety purposes) and from the suspension air bags (if the vehicle is so equipped) for load sensing, providing autonomous operation capability. The SCU 32 may also serve as a "black box" data recorder for critical system information, an interface to the vehicle CAN bus for data exchange with the vehicle as well as other electrical interfaces with optional modules for enhanced capabilities as required. The SCU 32 may be designed with an interface for an optional external data logger.

The SCU 32 is preferably designed to communicate with the OCU 30 over a Bluetooth LE link 44. This eliminates the need to run cables to the OCU 30, simplifying installation while maintaining reliability in commercial applications. For military-type applications or other situations where wireless operation may not be reliable, a hardwired communication cable 46 may be used to provide a robust alternative.

The SCU 32 has capability of operating with different types of OCUs 30 for different applications. For OEM applications, the SCU 32 may interoperate with the in-vehicle display terminal, possibly using a bridge module to provide data translation over the SCU's 32 CAN bus. For military applications where touch-screen operation may be problematic, a hard-wired controller may be used as an alternative. Finally, for autonomous operation, where no operator interface is necessary (or even desired), the OCU 30 may be merely an alarm panel to notify the operator of system failures.

One or more VCUs 34 control pressure in defined group(s) of tires. As shown, the VCUs 34 communicate with the SCU 32 over a daisy-chained Local Interconnect Network (LIN) bus 48, which may be used to connect to and control a number of VCUs 34. Each VCU 34 provides pressure control and monitoring, and may be used to provide automatic heater control (to prevent valve icing in cold temperatures) and fault handling for one group of tires.

Autonomous Tire Pressure Control

In one example, the system may include an autonomous tire pressure control functionality, which may allow a number of tire pressure control functions to be managed without operator interaction. This would be reliant on the air suspension load sensing sensor in the SCU 32 being connected to one air suspension group. One example of this type of operation may include automatically increasing tire pressure from an "unloaded" to a "loaded" pressure selection in response to detection of a load on the truck's rear axle air suspension, and exceeding a pre-defined threshold. When the load is removed, the tire pressures would return to the "unloaded" pressure selection for that setting selection. The autonomous operation may be controlled through the configuration files loaded in the OCU 30 and SCU 32 with no changes to system hardware. This offers flexibility and easy upgradeability for a wide range of applications where operation without driver intervention is desired.

A more complex functionality may be to control tire pressures in real time, with continuously variable settings, as an arbitrary function of the measured load and vehicle speed. This would be particularly advantageous on vehicles such as buses where operator and passenger comfort as well as tire life can be automatically optimized in accordance with policies set by the operating company, all without operator interaction. This may require additional hardware, such as the AVLSU 40 described below.

Optional Modules

The present system is preferably able to work with additional, optional modules, which may be provided on the LIN bus 48 of the SCU 32. Some examples of additional modules are described below, each of which may be used alone or in combination with other modules.

One example may include an automatic variable load sensing unit (AVLSU) 40 that provides a variable automatic control option to controlling tire pressures in accordance with vehicle weight and speed without operator intervention. The unit may be designed to control the tire pressure incrementally, or with infinite resolution. Each valve or axle group 50 (which represents tires 14, valves 18 and pressure sensors 22 discussed with reference to FIG. 1) may be assigned to a load sensing device in the system when active control is required on that axle group 50. Each axle group 50 may then be programmed with its own response to the weight reported from its assigned load sensing device 40. This added functionality allows for infinite selections between a "loaded" and an "unloaded" pressure, with the selection of an optimized pressure being calculated by interpolation in a table of pressure versus load and speed. The elements required to provide these features include the appropriate modules connected to the controller and to appropriate the load sensing devices on the vehicle, such as load cells, strain gauges, air bags, etc. The configuration files may then be loaded to define the controlled axle groups and the desired control algorithms.

Another option may include a scale measurement unit (SMU) 38, which provides truck and/or trailer weight, either through sensing suspension air bag pressure or through strain gauge measurement. In this case, the OCU 30 would have an axle weight measurement feature set added for interaction with the driver.

A remote control interface unit (RCIU) 42 may be provided that allows the system to be operated remotely via a set of simple commands from an existing on-vehicle device, or an installed on-vehicle device.

The system may also be capable of working with multiple SCUs, labeled as Alternative System Controllers 52 where all but the first may be considered a trailer control unit, for applications where it may be desirable to control multiple vehicle units (more than two trailers—road trains, for example). Any or all of these optional components can be added to the LIN bus 48 that controls the VCUs 34 with no other system changes. There is also shown an optional Alternative OCU 54, which may be an existing display unit in the operator's compartment that may be used instead of the OCU.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A tire pressure control system for a vehicle, comprising:
   a supply of compressed air connected to supply compressed air to a vehicle tire through an air conduit having a valve;
   an air pressure sensor that senses air pressure in the vehicle tire;
   a microcontroller that is connected to control the valve, the microcontroller controlling the valve to supply compressed air to the vehicle tire to increase the air pressure in the vehicle tire, and to vent compressed air from the vehicle tire to atmosphere to decrease the air pressure in the vehicle tire,
   the microcontroller comprising instructions to:
      upon receiving a signal indicative of a required change in tire pressure from a current pressure to a target pressure, calculate a calculated valve operation required to achieve the target pressure from the current pressure based on an algorithm stored in the microcontroller, wherein calculating the valve operation comprises calculating a length of time the valve is open to achieve the target pressure;
      perform a valve operation by operating the valve according to the calculated valve operation;
      measure an adjusted air pressure using the air pressure sensor after the valve operation is completed;
      compare the adjusted air pressure to the target pressure and calculating a further valve operation to achieve the target pressure from the adjusted air pressure if necessary; and
      compare the results of the valve operation to the calculated valve operation and recalibrate the algorithm used to calculate the valve operation based on any differences.

2. The tire pressure control system of claim 1, wherein the microcontroller further comprises instructions to activate an alarm condition if the comparison of the results of the valve operation to the calculated valve operation results in a difference that exceeds a predetermined threshold.

3. The tire pressure control system of claim 1, wherein the signal indicative of the required change is a signal from a manual input device.

4. The tire pressure control system of claim 1, wherein the signal indicative of the required change is a signal from one or more condition sensors that measure one or more vehicle conditions, the signal from the one or more conditions sensors being compared to predetermined ranges in the microcontroller to determine the target pressure.

5. The tire pressure control system of claim 4, wherein the one or more vehicle conditions comprise at least one of vehicle load, vehicle speed, and location.

6. The tire pressure control system of claim 1, wherein the microcontroller comprises instructions to calibrate the algorithm by operating the valve according to a series of predetermined valve operations and measuring the resulting tire pressures.

7. The tire pressure control system of claim 1, further comprising more than one tire connected to the supply of compressed air by one or more valves.

8. The tire pressure control system of claim 1, wherein, for a change in pressure that is greater than a predetermined threshold, the calculated valve operation comprises a series of valve operations, wherein an intermediate pressure is measured between valve operations in the series to recalibrate a remainder of the series of valve operations.

9. A method of controlling pressure in a vehicle tire, the vehicle tire being connected to a supply of compressed air by an air conduit having a valve, the valve being controlled by a microcontroller, the method comprising the steps of:
   transmitting a signal to the microcontroller indicative of a required change in tire pressure from a current pressure to a target pressure,
   causing the microcontroller to calculate a valve operation required to achieve the target pressure from the current pressure based on an algorithm stored in the microcontroller, wherein calculating the valve operation comprises calculating length of the time the valve is open to achieve the target pressure;
   causing the microcontroller to operate the valve according to the calculated valve operation;
   measuring an adjusted air pressure using an air pressure sensor after the calculated valve operation is completed;
   comparing the adjusted air pressure to the target pressure and calculating a further valve operation to achieve the target pressure from the adjusted air pressure if necessary; and
   comparing the results of the valve operation to the calculated valve operation and recalibrating the algorithm used to calculate the valve operation based on any differences.

10. The method of claim 9, wherein the microcontroller controls the valve to supply compressed air to the vehicle tire to increase the air pressure in the vehicle tire, and to vent compressed air from the vehicle tire to atmosphere to decrease the air pressure in the vehicle tire.

11. The method of claim 9, further comprising the step of activating an alarm condition if the comparison of the results of the further valve operation to the calculated valve operation results in a difference that exceeds a predetermined threshold.

12. The method of claim 9, wherein the signal indicative of the required change is received from a manual input device.

13. The method of claim 9, wherein the signal indicative of the required change is received from one or more condition sensors that measure one or more vehicle conditions, the signal from the one or more conditions sensors being compared to predetermined ranges in the microcontroller to determine the target pressure.

14. The method of claim 13, wherein the one or more vehicle conditions comprise at least one of vehicle load, vehicle speed, and location.

15. The method of claim 9, further comprising the step of calibrating the algorithm by operating the valve according to a series of predetermined valve operations and measuring the resulting tire pressures.

16. The method of claim 9, wherein more than one tires are connected to the supply of compressed air by one or more valves.

17. The method of claim 9, wherein, for a change in pressure that is greater than a predetermined threshold, the calculated valve operation comprises a series of valve operations, and wherein an intermediate pressure is measured between valve operations in the series to recalibrate a remainder of the series of valve operations.

\* \* \* \* \*